United States Patent [19]
McMurtry et al.

[11] Patent Number: 5,647,137
[45] Date of Patent: *Jul. 15, 1997

[54] PROBE ARM FOR MACHINE TOOL

[75] Inventors: David R. McMurtry, Wotton-Under-Edge; Andrew J. Harding, Bristol; Stephen E. Lummes, Stroud; Martin P. Spivey, Tetbury; Jonathan S. Sullivan, Wotton-Under-Edge, all of United Kingdom

[73] Assignee: Renishaw plc, Gloucestershire, United Kingdom

[*] Notice: The term of this patent shall not extend beyond the expiration date of Pat. No. 5,446,970.

[21] Appl. No.: 521,814

[22] Filed: Aug. 31, 1995

Related U.S. Application Data

[63] Continuation-in-part of Ser. No. 231,294, Apr. 22, 1994, Pat. No. 5,446,970.

[30] Foreign Application Priority Data

Apr. 22, 1993 [GB] United Kingdom ............... 9308364
Jun. 12, 1995 [GB] United Kingdom ............... 9511856

[51] Int. Cl.$^6$ .......................... G01B 5/012; F16D 71/04
[52] U.S. Cl. .................. 33/572; 33/559; 192/139; 192/142 R
[58] Field of Search .................. 33/556, 558, 559, 33/561, 503, 1 D, 572; 192/139, 142 R

[56] References Cited

U.S. PATENT DOCUMENTS 4,168,576  9/1979  McMurtry.
5,084,981  2/1992  McMurtry et al..
5,088,337  2/1992  Bennett.
5,446,970  9/1995  McMurtry et al. ............... 33/572

FOREIGN PATENT DOCUMENTS 0392660    10/1990  European Pat. Off..
3503637A1   8/1986  Germany.
3830904A1   3/1990  Germany.
4300745A1   7/1994  Germany.
62-32071    7/1987  Japan.

OTHER PUBLICATIONS

Renishaw Data Sheet TS20 ("Two Axis Tool Setting Probe for CNC Lathes") published Oct., 1992 (revised version of original data sheet dated 1987).
Renishaw Data Sheet HPA ("High Precision Tool Setting Arm for CNC Lathes") published Mar. 1991 (revised version of original data sheet dated 1988).
Yamazaki Mazak brochure "Quick Turn 35N", p. 6, publication date uncertain but approximately 1990.
Yamazaki Mazak brochure "Slant Turn 28N & 35N", p. 8, publication date uncertain but approximately 1990.
H.J.J. Braddick "Mechanical Design of Laboratory Apparatus", Chapman & Hall, London, 1969, pp. 11–30.

*Primary Examiner*—G. Bradley Bennett
*Attorney, Agent, or Firm*—Oliff & Berridge

[57] ABSTRACT

An arm 12 for holding a tool-setting probe 14 in a machine tool is rotatable between an operative position and an inoperative position. The operative position is defined by elements 48,52 which form a stop against further rotary motion beyond the operative position. These elements 48,52 are arranged as a kinematic support, so that the operative position is defined in a precisely repeatable manner. Springs 40 urge the elements 48,52 together. When the arm is in the operative position, these springs are stretched by a repeatable amount, so that they provide a repeatable force, in order to increase the precision of the operative position.

12 Claims, 9 Drawing Sheets

PROBE ARM FOR MACHINE TOOL

CROSS REFERENCE TO RELATED APPLICATIONS

This application is a continuation-in-part of U.S. patent application Ser. No. 08/231,294 filed on Apr. 22nd, 1994, now U.S. Pat. No. 5,446,970.

FIELD OF THE INVENTION

This invention relates to mechanisms which can be used for an arm for holding a probe in a machine tool.

DESCRIPTION OF PRIOR ART

It is known to mount a tool setting probe in a machine tool. The probe is mounted to the bed or table of the machine tool, such that a cutting tool can be moved into contact with it. This enables the location of the cutting tip of the tool to be established, in order to set offsets associated with the tool for use by the numerical control of the machine.

In many machines, the tool setting probe would get in the way if permanently mounted in the required position. Consequently, it is known to mount it on a movable arm, which in turn is mounted to the bed of the machine. In one arrangement, commercially available from Yamazaki Mazak Corporation, the arm is motorised, and can be automatically indexed between an operative position and an inoperative position. In this device, the motor simply drives the arm to a fixed stop, which defines the operative position. However, the fixed stop does not define the position very repeatably, and so there can be a corresponding error in the repeatability of the offsets which are measured by use of the probe. Another commercially available arrangement is the Renishaw High Precision Arm (HPA), comprising an arm which can be mounted in the operative position on a base, via a kinematic support. The kinematic support ensures that the arm (and thus the probe) is positioned in a highly repeatable manner, so that the offsets may be determined repeatably. The arm is mounted manually, by offering the arm up to the base and fastening it in position; it is also demounted manually. The arm is therefore not indexable between operative and inoperative positions.

The kinematic support, as used in the Renishaw High Precision Arm, comprises elements on the arm which are arranged to cooperate with elements on the base to give the highly repeatable positioning. Specifically, the elements on the base are arranged to provide a pair of mutually converging surfaces at each of three spaced locations, in such a manner as to provide a total of six points of contact with the elements on the arm. This constrains the six possible degrees of freedom of the arm relative to the base. The six points of contact are all in the same plane, and the converging surfaces converge in a direction normal to that plane.

Such a kinematic support is sometimes known as a Boys support, and is described in, for example, H. J. J. Braddick, "Mechanical Design of Laboratory Apparatus", Chapman & Hall, London, 1960, pages 11–30. Braddick also describes a functionally equivalent kinematic support, sometimes known as a Kelvin support, in which the six points of contact or constraints are provided three at a first location, two at a second spaced location, and one at a third spaced location. The terms "kinematic", "kinematically constrained" and like terms, as used in this specification, encompass Boys supports, Kelvin supports and other kinematic and semi- or quasi-kinematic types of support. U.S. Pat. No. 5,088,337 describes a head for mounting a probe in a coordinate measuring machine. The head enables the probe to be rotated manually to any of a number of index positions, each of which is defined by a kinematic support. The elements making up the kinematic support are urged into engagement in the axial direction, necessitating a relatively complex mechanism for unlocking and locking the axial force before and after each rotary movement. Similar heads are commercially available which contain motors for automatically rotating the probe between the index positions, for example the Renishaw PH10M probe head.

SUMMARY OF THE INVENTION

One broad aspect of the invention relates to an arm which can be moved between operative and inoperative positions, and which is kinematically supported when in the operative position. The arm may, for example, be extended linearly from and retracted linearly into a housing by a motor such as a hydraulic or pneumatic ram. In a further aspect, the invention provides means for ensuring that the arm is clamped into the kinematic support with a repeatable force, in order to improve the repeatability of the positioning.

More particularly, one aspect of the invention provides a probe arm for a machine tool comprising:

a fixed member for attachment to the machine tool;

an elongate movable arm member for carrying a probe, the movable arm member having an axis;

a guide which guides the movement of the movable arm member in an axial direction between an inoperative position in which it is retracted towards the fixed member, and an operative position in which it is extended away from the fixed member;

a stop between the fixed member and the movable arm member, which defines said operative position and prevents further movement of the movable arm member past the operative position, said stop comprising first elements on the fixed member and second elements on the movable member, the first and second elements being urged together in the operative position and cooperating with each other to constrain the degrees of freedom of the movable arm member kinematically, thereby precisely defining the operative position of the movable arm member.

BRIEF DESCRIPTION OF THE DRAWINGS

Preferred embodiments of the invention will be described by way of example, with reference to the accompanying drawings, wherein.

DESCRIPTION OF PREFERRED EMBODIMENTS

Figure 1:
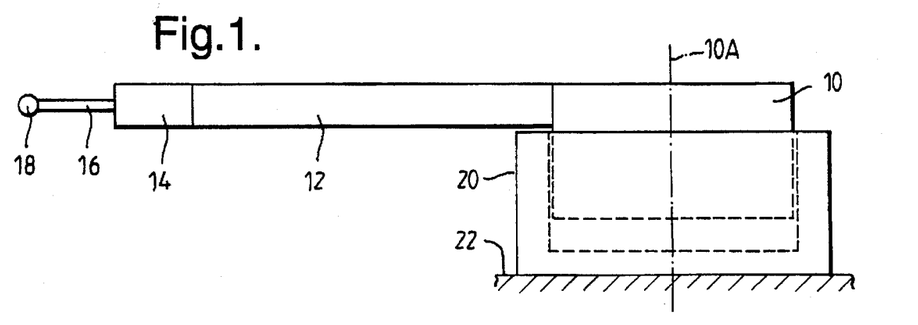
FIG. 1 is a side view of a probe-carrying arm and a device for rotating it automatically.

The device shown in FIG. 1 comprises a rotatable hub 10 carrying a radially-projecting arm 12. A probe 14 is mounted at the free end of the arm 12, and has a deflectable stylus 16. The probe 14 can be, for example, a touch trigger probe of the type described in U.S. Pat. No. 4,153,998. Its stylus 16 may have a conventional spherical tip 18 as shown, or the tip 18 may be replaced by a conventional tool setting tip, e.g. cube-shaped.

The hub 10 is mounted in a housing 20 in a manner described below, so as to be rotatable about its axis 10A. The housing 20 is mounted to convenient fixed structure 22, such as the bed of a lathe or grinding machine or other machine tool.

Figure 2:
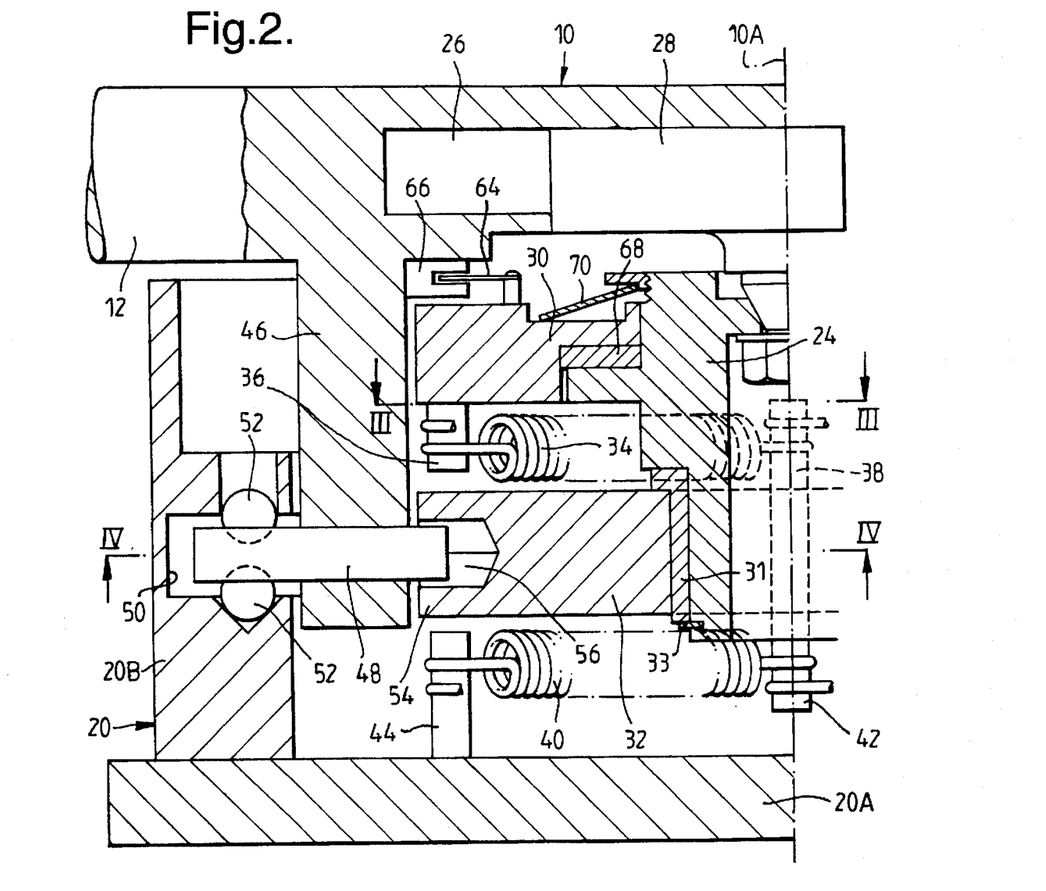
FIG. 2 is an enlarged cross-section of part of the device shown in FIG. 1.

As seen in FIG. 2, within the hub 10 there is provided a concentric rotor 24, mounted on the output pinion of a worm drive 28. The worm drive 28 has a motor 26, also within the hub 10. If necessitated by space restrictions, the motor 26 may be located within the arm 12. The hub 10 and rotor 24 are rotatable relative to each other about the axis 10A, by means of the motor 26 acting through the worm drive 28.

The rotor 24 carries a rotor disc 30, which rotates with it. It also carries an intermediate disc 32, which is rotatable relative to the rotor 24 on a bushing 31. This allows the disc 32 to have a certain amount of play, both radially and axially. The disc 32 is retained by a circlip 33. The bushing 31 and circlip 33 are chiefly provided to aid assembly, and could be omitted if desired. The disc 32 will then be retained solely by springs, which are described below.

Figure 3:
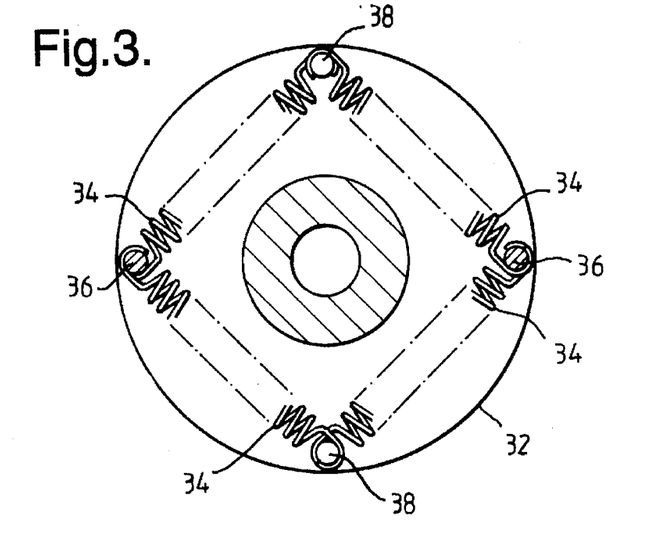
FIG. 3 is a section on the line III—III in FIG. 2.

Referring also to FIG. 3, the rotor disc 30 and intermediate disc 32 are linked by a system of four tension springs 34. The rotor disc 30 has two depending posts 36, while the intermediate disc 32 has two upstanding posts 38. Each spring 34 links one of the posts 36 to an adjacent post 38, the springs thus forming a nominally square configuration when the rotational position of the discs is such that the springs are all equally tensioned.

As partially seen in FIG. 2, a similar system of four tension springs 40 links the intermediate disc 32 to the floor 20A of the housing 20. The intermediate disc 32 has two depending posts 42, while the floor 20A of the housing has two upstanding posts 44, and the springs 40 link these posts, again in a nominally square configuration when the rotational position of the intermediate disc 32 is such that the springs 40 are all equally tensioned. For convenience, each post 42 may be formed integrally with one of the posts 38, by a peg which passes right through the intermediate disc 32.

Figure 4:
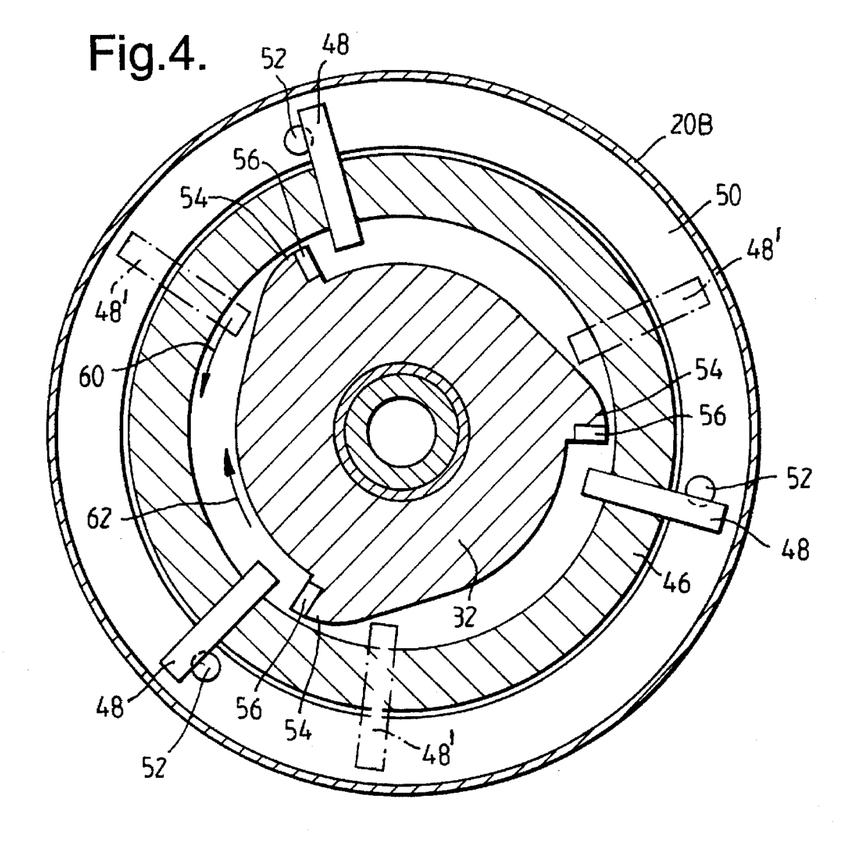
FIG. 4 is a section on the line IV—IV in FIG. 2.

Referring to FIGS. 2 and 4, the hub 10 includes a depending skirt 46, which fits rotatably inside an upstanding wall 20B of the housing 20. The skirt 46 carries three cylinders 48, which project radially both inwardly and outwardly, and which are equally spaced from each other at angles of 120° around the axis 10A.

The rotational mounting between the hub 10 and the housing 20 is deliberately made somewhat sloppy, for reasons explained below. One way in which the rotational mounting can be achieved is by having the outwardly projecting end of each of the cylinders 48 run in a groove 50 on the inside of the wall 20B of the housing. At three locations spaced equally around the axis 10A, the groove 50 is interrupted by a pair of balls 52 which are spaced apart in the axial direction. Each pair of balls defines a pair of surfaces which are mutually convergent in the circumferential direction, and which confront each other in the axial direction. When the hub 10 is rotated, the outwardly projecting parts of the three cylinders 48 eventually engage with the three pairs of balls 52, giving a total of six points of contact. These six points of contact kinematically define the location of the hub 10, arm 12 and probe 14, relative to the housing 20, when located in this position. This is the operative position in which the probe 14 is used for tool setting or measuring purposes. In this position, it is important that the rotational mounting between the hub 10 and housing 20 should not provide any significant additional constraints, and this is the reason for the somewhat sloppy mounting mentioned above.

Of course, when the hub is not in this kinematically defined location, the rotational mounting can be less sloppy to give smooth running, for example by providing a tighter fit between the free end of the cylinder 48 and the groove 50. One way to achieve this is described below in relation to FIG. 6. Other rotational mounting arrangements are possible, and if there is no groove 50 then the balls 52 may be mounted on three projections on the inner face of the wall 20B.

The intermediate disc 32 has three radially projecting portions 54, seen most clearly in FIG. 4 but omitted from FIG. 3 for simplicity. These portions can engage with the inwardly projecting ends of the cylinders 48.

The portions 54 could carry pairs of balls, like the balls 52, to give fully kinematic location between the intermediate disc 32 and the hub 10. However, this is generally unnecessarily complex. There is a requirement for a defined relationship between the intermediate disc 32 and the hub 10, but this is less so than between the hub 10 and the housing 20. Accordingly, a semi- or quasi-kinematic support suffices in this instance. To achieve this, each projecting portion 54 has a simple radially directed V-groove 56, the sides of which form surfaces which are mutually convergent in the circumferential direction, and which confront each other axially. These surfaces can engage the inwardly projecting end of the cylinder 48. The radial and axial play of the intermediate disc 32 on the rotor 24 facilitates positive engagement. If desired, the arrangement could be simpler still, the projecting portion 54 providing a plain abutment or stop for engaging with the cylinder 48, instead of the V-groove 56. In the latter case, however, there should be no substantial play between the disc 32 and the rotor 24.

The operation of the device will now be explained.

When the arm 12 is in the inoperative position, the rotational position of the hub 10 is such that the cylinders 48 are in the position shown by broken lines at 48' in FIG. 4. The motor 26 is now operated, acting on the rotor 24 through the worm drive 28. Since the rotor 24 is connected to the housing 20 (via the discs 30,32 and springs 34,40), at first the rotor 24 remains stationary and operation of the motor 26 causes the hub 10 and arm 12 to rotate in the direction of arrow 60 in FIG. 4. This moves the cylinders 48 towards the respective pairs of balls 52.

When the cylinders 48 and balls 52 engage, this locates the hub 10 and the arm 12 kinematically in the operative position, and obviously they can rotate no further. Continued action of the motor 26 therefore causes rotation of the rotor 24 and rotor disc 30 in the opposite sense. The intermediate disc 32 also rotates with the rotor disc 30, as indicated by the arrow 62 in FIG. 4, though to a lesser extent. As the intermediate disc 32 rotates, an opposing pair of the springs 40 are stretched, increasing their tension, while the other two springs 40 are relaxed, reducing their tension. The result is a torque applied between the intermediate disc 32 and the housing 20. Similarly, the tensions of the springs 34 are respectively increased and decreased, giving a similar torque between the discs 30 and 32.

After a certain amount of rotation of the intermediate disc 32, the V-grooves 56 in the projections 54 engage with the inner ends of the cylinders 48. They are held in engagement by the torque provided by the springs 34. This torque continues to increase, because the rotor disc 30 continues to rotate relative to the intermediate disc 32 (which is now stationary). Eventually, continued rotation of the disc 30 causes a rotor arm 64 (which is attached to the disc 30) to interrupt a light beam in an opto-electronic switch 66 attached to the housing. This stops the motor 26 and brings the rotor 24 and rotor disc 30 to a standstill. An electro-mechanical micro switch can be used in place of the switch 66, if desired.

The arm 12 is now held clamped in the kinematically-defined operative position as follows. The torque provided by the springs 34 exceeds that provided by the springs 40, thereby holding the V-grooves 56 of the intermediate disc 30 in contact with the inner ends of the cylinders 48. However, the torque from the springs 34 acts through a closed loop which includes the rotor 24 and the hub 10, but which excludes the kinematic location between the cylinders 48 and balls 52. Consequently, the (somewhat unpredictable) torque provided by the springs 34 does not affect the kinematic location.

The force which clamps the cylinders 48 into the balls 52 is provided solely by the torque of the springs 40 acting between the intermediate disc 32 and the housing 20. This torque is caused by a defined amount of rotation of the disc 32 relative to the housing 20, determined by the position of the engagement of the V-grooves 56 with the cylinders 48. This stretches and relaxes the springs 40 by a predetermined amount, controlled only by the geometry of the system. It follows that the clamping force between the cylinders 48 and balls 52 is quite repeatable. That is, the same clamping force will be applied each time the device is operated. This is important, because if the force were unpredictable, it could affect the precise location provided by the kinematic support or mounting.

Thus, the repeatability of the clamping force assures the repeatability of the kinematic location. In turn, this assures the repeatable positioning of the probe 14 when in the operative position, and thus the repeatability of the tool setting offsets which are measured with the probe, or any other measurements which it is used to make.

In the above description, it has been assumed that the rotor 24 and rotor disc 30 rotate together as a unit. Indeed, that is normally the case. However, preferably a clutch is provided between the two. As shown in FIG. 2, this may comprise an annulus of friction material 68 trapped between two flanges on the rotor 24 and disc 30, which are urged towards each other by a spring washer 70. This clutch acts as a safety device, should the opto-electronic switch 66 fail to stop the motor 26 for any reason. Stops (not shown) may be provided between the rotor disc 30 and the hub 10, and as soon as the stops engage, the clutch 68 starts to slip. This prevents overstretching of the springs 34 and stalling of the motor 26.

Of course, this safety arrangement may be modified. In one modification, there are no stops between the disc 30 and hub 10, the clutch 68 slipping simply when the torque provided by the springs 34 exceeds a certain threshold. In another modification, the opto-electronic switch 66 and rotor arm 64 may be omitted, the motor 26 being cut out by a current monitoring device which acts when the motor current exceeds a certain value as the torque of the springs 34 increases, or as the stops between the disc 30 and the hub 10 engage. Alternatively, if the motor 26 is sufficiently robust, it may simply be allowed to stall. In any of the above modifications, the clutch 68 may be omitted.

The device described may be simplified by the omission of the springs 34, if desired. A single disc having the projections 54 is now provided to rotate with the rotor 24, in place of the two discs 30,32. When the projections 54 engage with the inner ends of the cylinders 48, they are held in engagement by continued action of the motor 26, the clutch 68 slipping continuously in this state. Alternatively, the clutch 68 can be omitted, the motor 26 can be allowed to stall or it can be cut off by a current monitoring device. The torque on the disc is now maintained by the worm drive 28 jamming, in order to keep the projections 54 in engagement with the cylinders 48. None of these arrangements is preferred, however.

Figure 5:
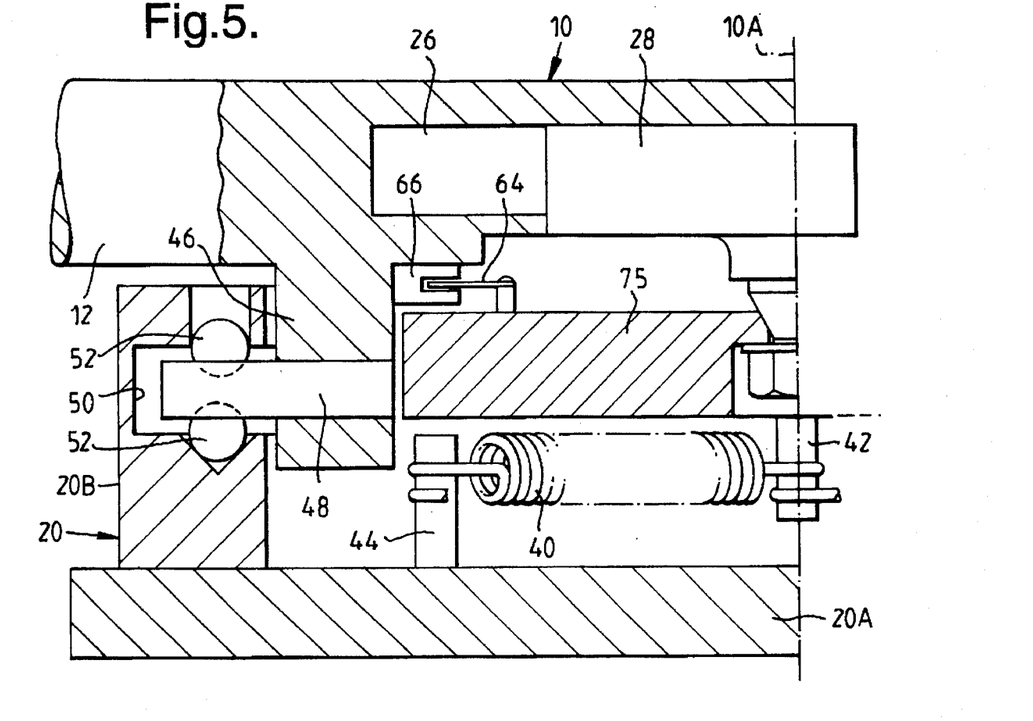
FIG. 5 is a section similar to FIG. 2, but showing a modified device.

FIG. 5 shows an even simpler arrangement, the same reference numerals being used as in FIG. 2 where appropriate. The discs 30,32 are replaced by a single disc 75 attached to the output pinion of the worm drive 28. As above, the springs 34 are omitted, and the disc 75 is connected to the floor 20A of the housing through the posts 42,44 and the four tension springs 40. In this present arrangement, the projections 54 and V-grooves 56 are also omitted, and the cylinders 48 do not project inwardly from the skirt 46.

When the motor 26 operates, at first the hub 10 rotates in the housing 20 as previously, until the cylinders 48 engage kinematically with the pairs of balls 52. Next, the disc 75 rotates in the opposite sense relative to the hub 10, causing an increasing torque to be applied by the springs 40. This continues until the arm 64 meets the opto-electronic switch 66, cutting off the motor. As previously, the switch 66 can be replaced by an electro-mechanical microswitch, if desired.

The cylinders 48 are now clamped into the pairs of balls 52 by a force which is set by the torque in the springs 40 when the disc 75 comes to rest. This torque depends on the characteristics of the switch 66, the motor 26 and the worm drive 28, and on the inertia of the system. However, it can still be adequately repeatable to ensure that the kinematic positioning of the arm 12 is sufficiently repeatable for many purposes.

Figure 6:
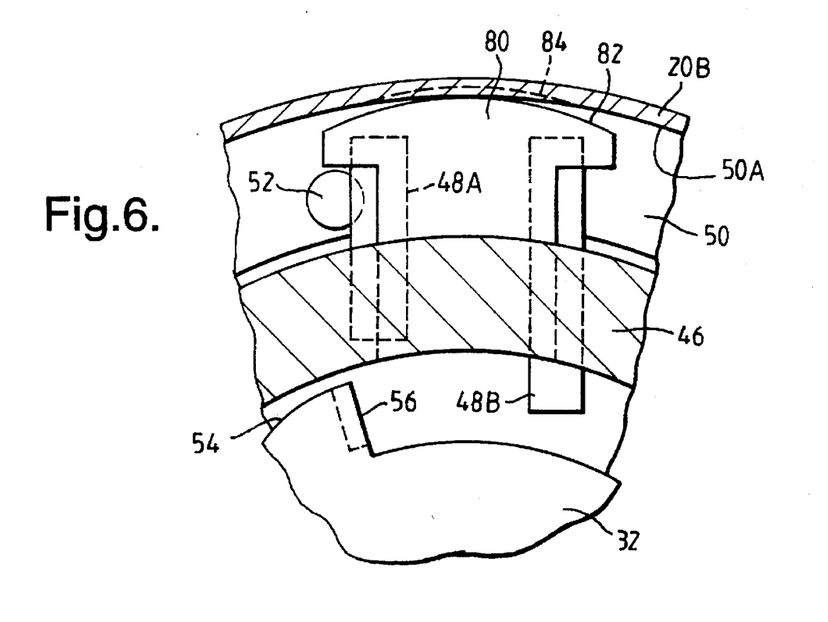
FIG. 6 is a section on the same line as FIG. 4, but showing part of another modified device.

FIG. 6 shows a further modification of the device of FIGS. 2–4, in which each cylinder 48 is replaced by a pair of cylinders 48A,48B. These are both mounted in the skirt 46 of the hub 10, and a plastic unit 80 is held between them. The cylinder 48A engages the balls 52, as before. Both this cylinder and the balls may be made from tungsten carbide, for reliable kinematic location. Only the cylinder 48B projects inwardly to engage the V-groove 56 in the projection 54, and this cylinder can be made from steel since its role is less demanding. The outer edge 82 of the plastic unit 80 is curved as shown, and has only a very small clearance from the bottom 50A of the groove 50, providing for smooth rotation of the hub 10 in the housing 20. Similarly, the top and bottom surfaces of the unit 80 may be curved and have only very small clearances from the opposing sides of the groove 50. The unit 80 may be made from a low friction material, such as PTFE. To prevent undue constraints when the cylinders 48A and the balls 52 are kinematically engaged, the bottom 50A of the groove 50 may be slightly relieved in the region of the balls 52, as indicated by the broken line 84, and the sides of the groove 50 may likewise be relieved in this region.

Various modifications for the kinematic support formed by the cylinders 48 and balls 52 will be apparent to the skilled man.

In one possible modification, the three cylinders 48 may be replaced by three balls, mounted on a radial projection from the skirt 46 so as to face in the circumferential direction. These then cooperate respectively with three radially directed V-grooves, which have circumferentially directed mutually convergent surfaces similar to the V-grooves 56 but formed in the housing 20 in place of the pairs of balls 52. Each of these V-grooves may be replaced by a pair of parallel cylinders, extending radially and spaced apart axially.

Alternatively, instead of three such V-grooves, one of the balls on the skirt 46 cooperates with a flat surface on the housing 20; one with a radial V-groove or pair of cylinders; and one with a trihedral or conical hole, or with a nest of three balls on the housing 20. These elements each face in appropriate directions to ensure proper kinematic constraint. This arrangement can be considered as a modified Kelvin support, whereas the cylinders 48 and balls 52 can be considered as a modified Boys support.

It is also possible to provide an inverse arrangement for the cylinders 48 and balls 52, in which the cylinders 48 are on the housing 20 and the balls 52 are on the skirt 46. Similar inverse arrangements can be devised for the various modified kinematic supports just discussed.

In the above embodiments, tension springs have been used to bias the elements of the kinematic support in the circumferential direction, into engagement with each other. Of course, other bias means may be used, such as torsion springs, or even a suitable arrangement of magnets.

As mentioned above, the device can be mounted on fixed structure of a machine tool, such as the bed of a lathe or grinding machine, so that the probe 14 acts as a tool setting probe. Alternatively, however, it is possible to mount the device on the moving structure of a machine tool, for example the spindle of a machining centre, the turret of a lathe or the carriage which holds the grinding wheel in a grinding machine. The probe may then be swung into the operative position in order to make the measurements on a workpiece which is mounted on the machine tool. In a grinding machine, for example, this may include location of features of the workpiece which are to be ground, after which the arm 12 is swung into the inoperative position to permit accurate grinding of those features. In a lathe, when the arm 12 is in the operative position it may effectively provide an extension to the turret, enabling probing of the blind side of a workpiece which the turret normally cannot reach. This can enable, for example, measurement of the diameter of a workpiece held stationary in the chuck of the lathe, to determine whether any thermal drift has taken place between the centre line of the lathe chuck and the turret. Such thermal drift would cause diameters to be machined oversize or undersize.

The embodiment of FIGS. 7–11 will now be described.

This embodiment comprises a housing 200 which can be fixed to the fixed structure of a machine tool. A hub 202 carries an arm 204, the free end of which (not shown) carries a probe in the same manner as in FIG. 1. The hub 202 is mounted for rotation on the housing 200, so as to index the arm 204 between an inoperative and an operative position, in a manner which will be described below. To prevent the ingress of swarf or coolant, a suitable seal may be provided between the hub and the housing in a region 206. A further seal as described in co-pending UK Patent Application No. 9515823.4 may also be provided.

Figure 7:
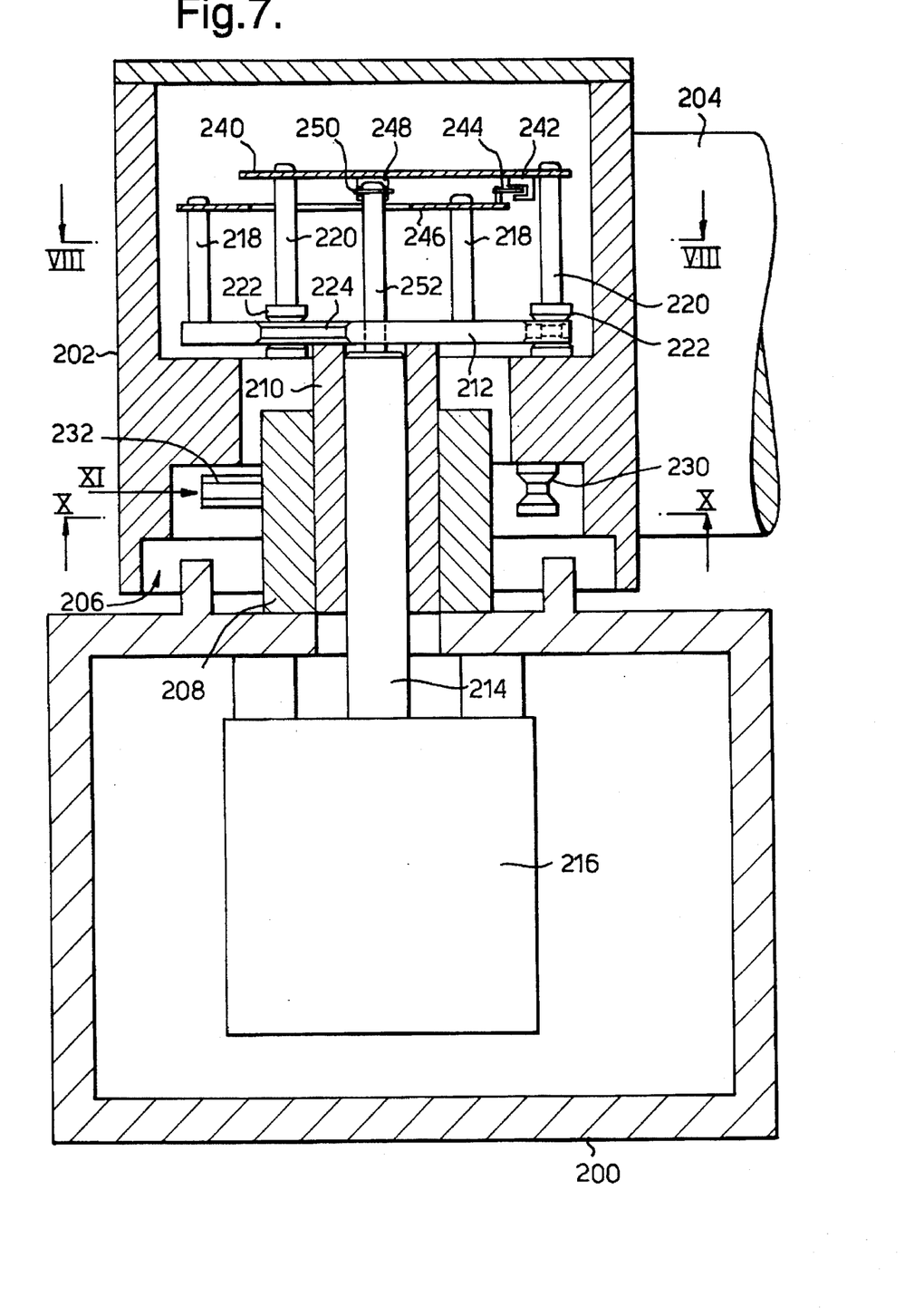
FIG. 7 is a cross-section through a further device for rotating a probe-carrying arm.

A bearing sleeve 208 is fixed to the housing 200, and a tubular shaft 210 is rotatably mounted within the bearing sleeve. The shaft 210 carries a rotatable plate 212 within the body of the hub 202. A motor 216 is provided within the housing 200, the rotating shaft 214 of which fits tightly within the tubular shaft 210, in order to rotate the plate 212 between operative and inoperative angular positions.

Figure 8:
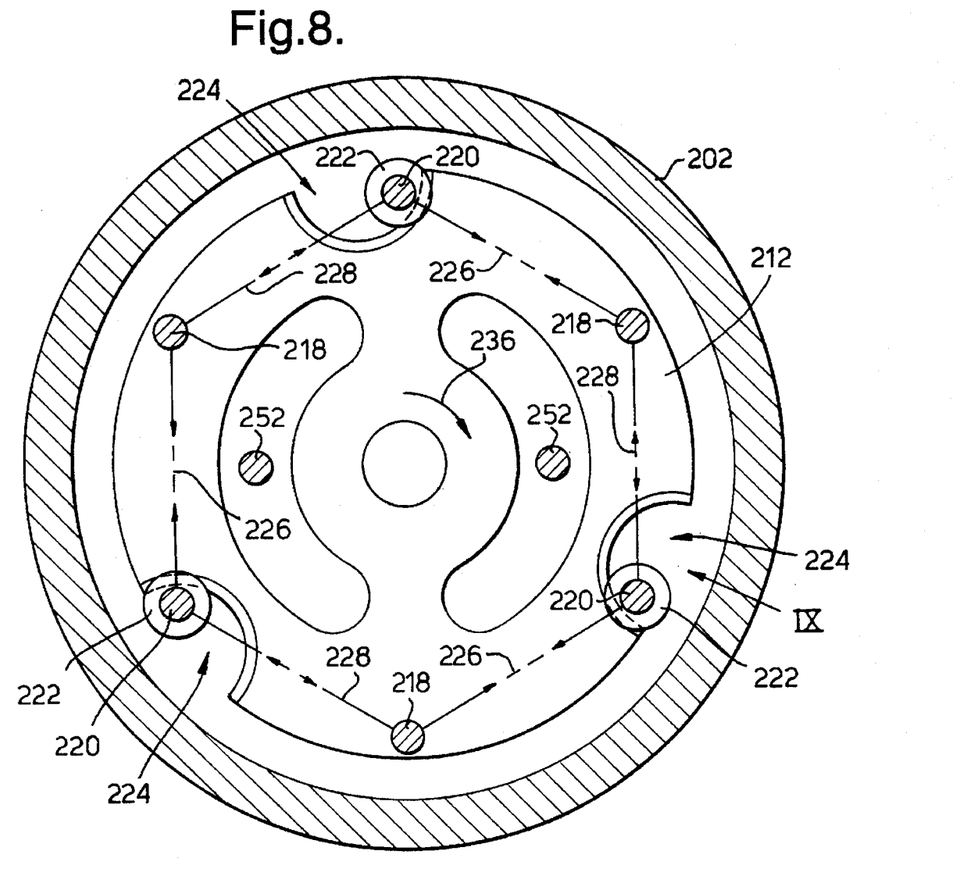
FIG. 8 is a section on the line VIII—VIII in FIG. 7.

The plate 212, which is also seen in FIG. 8, has three upstanding posts 218, spaced apart by 120°. Three further upstanding posts 220 are fixed within the body of the hub 202, at positions generally intermediate between the posts 218. At their lower ends, where they are fixed to the body of the hub 202, the posts 220 each carry a double conical flange portion 222, which forms a vee-groove around the circumference of the post. Each of these double conical portions 222 engages in a respective semi-circular cut-out 224 in the periphery of the plate 212.

Figure 9:
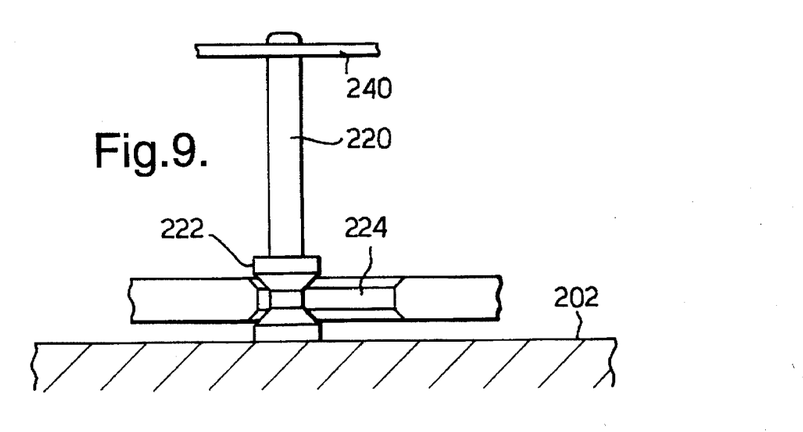
FIG. 9 is a view of an internal detail, taken on the line IX in FIG. 8.

Each cut-out 224 has chamfered upper and lower edges, which respectively engage with the upper and lower conical surfaces of the double conical flange 222. They are normally held in this engaged condition, as seen in FIGS. 8 and 9, by means of springs which link the posts 218 to the posts 222. For clarity, these are shown only in FIG. 8 as phantom arrows, and comprise three tension springs 226 and three compression springs 228.

Thus, in the normal condition seen in FIGS. 8 and 9, the hub 202 is held to the plate 212 in a kinematic or semi-kinematic fashion, there being the necessary six points of contact between the hub 202 and the plate 212, namely the upper and lower chamfered surfaces of each of the cut-outs 224 engaging with the upper and lower conical surfaces on each of the posts 220. The motor 216 is therefore able to rotate the hub 202 (with the probe-carrying arm 204) from the inoperative position towards the operative position, in the direction of arrow 236 (FIG. 8), and vice-versa. In the present embodiment, there is no need for the sloppy rotational mounting used in the device of FIG. 2, and so the arm 204 rotates smoothly on the bearing sleeve 208. Such smooth rotation creates a much better impression in the mind of the customer when the device is in use.

Figure 10:
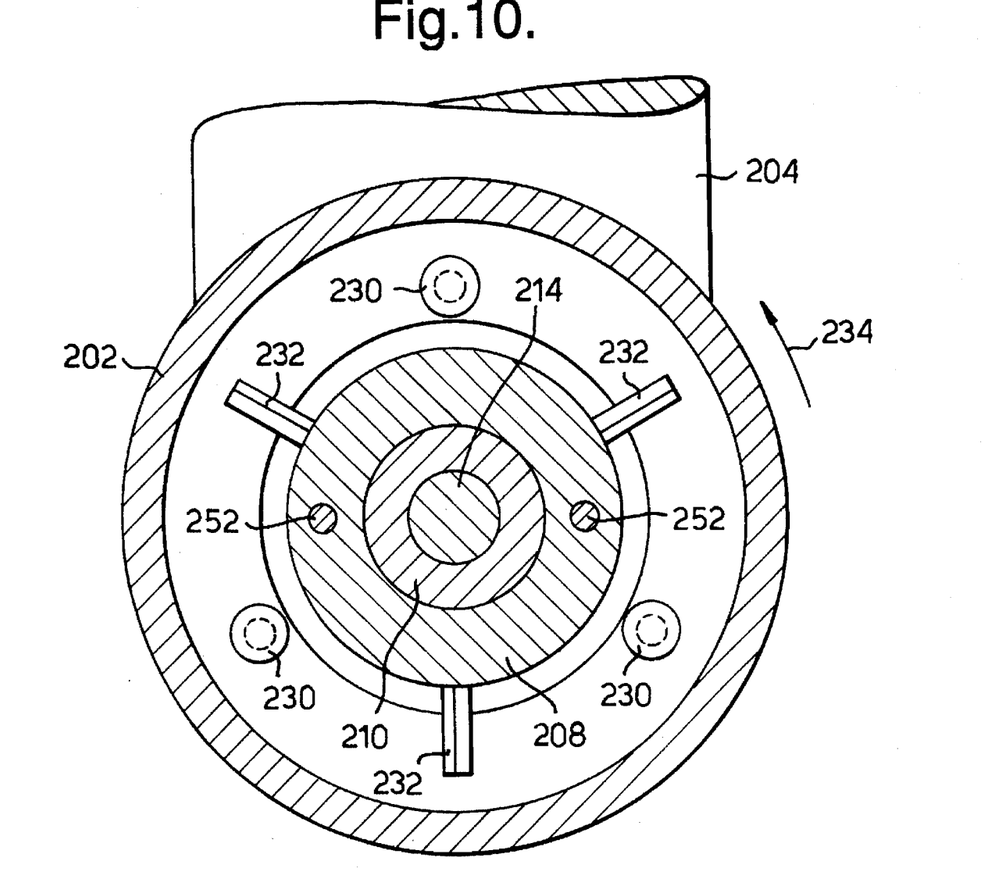
FIG. 10 is a section on the line X—X in FIG. 7.
Figure 11:
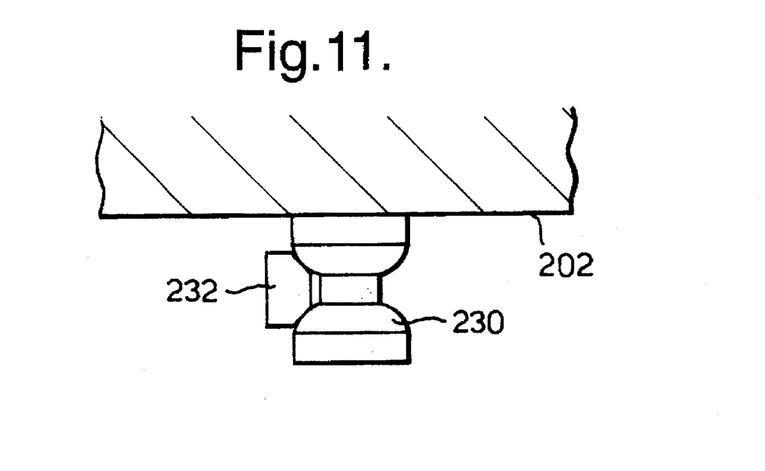
FIG. 11 is a view taken on the line XI in FIG. 7 of certain internal details shown in an engaged condition.

Referring now to FIGS. 7,10 and 11, the operative positon of the device is defined as follows. Three further double conical flange portions 230 are provided within the hub 202, and three spigots 232 project radially from the bearing sleeve 208 (which of course is fixed to the housing 200). As the hub 202 rotates in the direction of arrow 234 (FIG. 10) and arrow 236 (FIG. 8) from the inoperative position towards the operative position, each portion 230 is brought closer to a respective one of the spigots 232, until they engage in the operative position. The spigots 232 have upper and lower chamfered surfaces, which engage with the upper and lower conical surfaces of the portions 230, in a similar manner to the engagement of the conical portions 222 in the cut-outs 224. This engagement in the operative position is best seen in FIG. 11. It will be understood that, in the operative positon, the hub 202 (with the arm 204) is now kinematically engaged with the fixed housing 200, via the portions 230 and the spigot 232.

After the hub 202 and arm 204 have reached this operative position, the motor 216 continues to rotate the plate 212 through a further small angle in the direction of the arrow 236 (FIG. 8). This ensures that the double conical flange portions 222 disengage from the cut-outs 224, so that they do not interfere with the kinematic conditions provided by the portions 230 and spigots 232. The portions 230 and spigots 232 are now biased into engagement with each other by the springs 226,228.

The motor 216 is switched off as follows. The posts 220, which are attached to the hub 202, carry a board 240, on which is provided a photoelectric microswitch 242 (see FIG. 7). Likewise, the posts 218, whch are attached to the plate 212 and rotate with the motor 216, carry a board 246 (which has appropriate cut-outs to accommodate the posts 220). This board 246 carries an actuator vane 244 for the photoelectric microswitch 242. Thus, after the plate 212 has rotated through the further small angle mentioned above, the motor is switched off by the photoelectric microswitch 242, actuated by the vane 244.

The angular position at which the vane 244 actuates the microswitch 242 is fairly repeatable, i.e. the further small angle through which the plate 212 rotates is always approximately the same. This means that the springs 226,228 are compressed and extended by the same amount each time, with the result that the force biasing the portions 230 into engagement with the spigots 232 is also reasonably repeatable.

When the motor 216 is actuated in the reverse direction to move the arm 204 from the operative towards the inoperative position, the cut-outs 224 in the plate 212 re-engage with the double conical flange portions 222, thereby causing the portions 230 to disengage from the spigots 232. After the required amount of rotation to bring the hub 212 and the arm 204 to the inoperative position, the motor is switched off by a further photoelectric microswitch 248 mounted on the board 240. This is actuated by a vane 250 which is mounted on two upright posts 252. These posts 252, seen in FIGS. 8 and 10 as well as FIG. 7, are fixed to the housing 200 via the bearing sleeve 208.

As shown in the detail of FIG. 11, it can be advantageous if the conical surfaces of the portion 230 are not truly conical, but slightly barrelled, having a slight curvature in the plane of FIG. 11. This ensures that each conical surface has only a point contact with the corresponding chamfered surface of the spigot 232, rather than a line contact. In turn, this ensures that the support provided for the hub 202 and arm 204 in the operative position is truly kinematic, whereas if there were small regions of line contact instead of point contact the support would only be semi-kinematic. Of course, the same effect could be achieved by making the spigots 232 as cylindrical rods engaging with the conical surfaces.

The double conical flange portions 222 may similarly be modified with slightly barrelled conical surfaces, although the kinematic conditions of engagement between the portions 222 and the cut-outs 224 are less critical. Thus, it would be possible to have a non-kinematic engagement between the plate 212 and the hub 202, if desired.

Of course, other forms of kinematic engagement between the hub 202 and the fixed housing structure in the operative position can be envisaged, including but not limited to placing the portions 230 on the fixed structure with the spigots 232 extending radially inwards from the wall of the hub 202. Likewise, other kinematic arrangements can be envisaged between the hub 202 and the plate 212.

Figure 12:
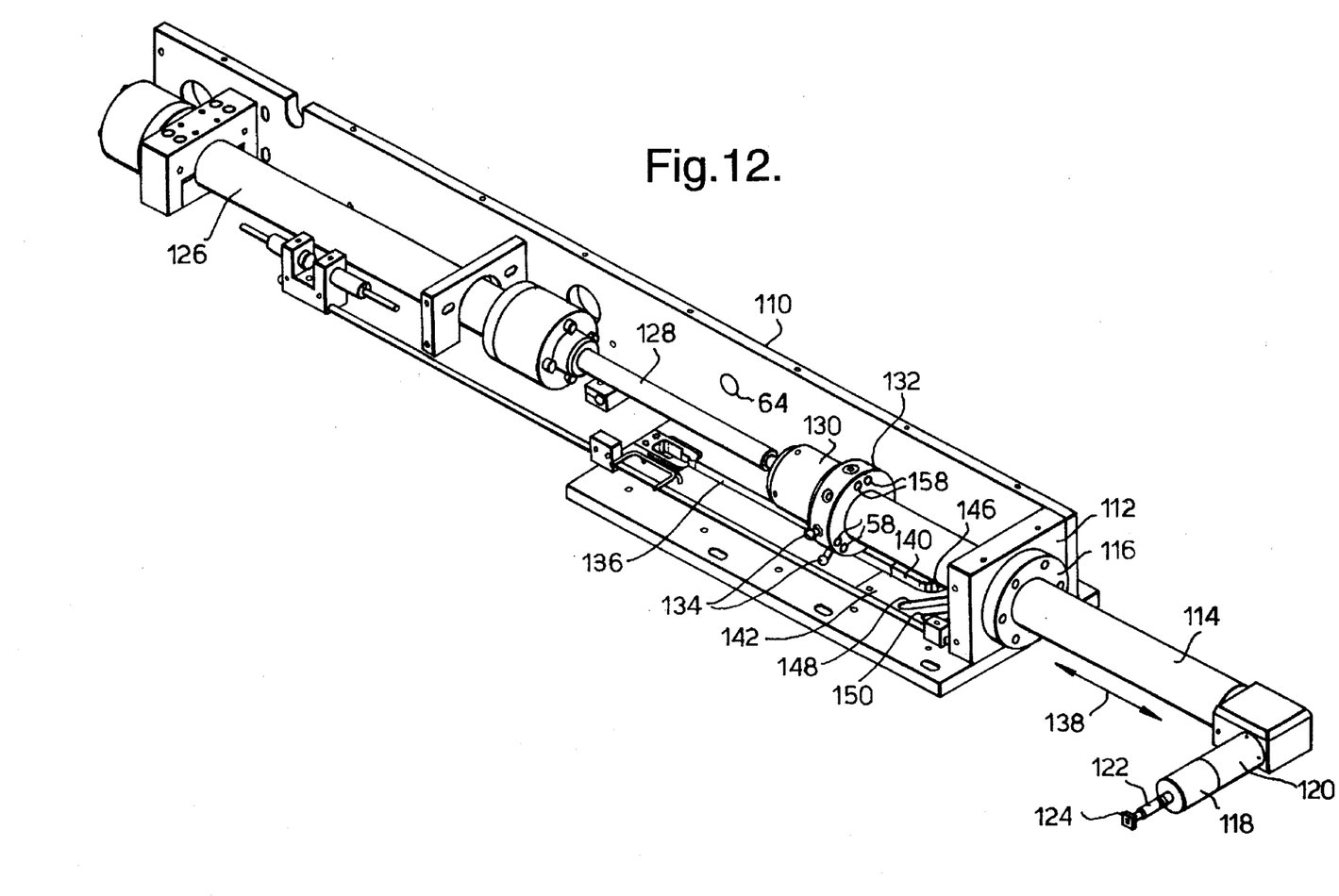
FIG. 12 is an isometric view of a linearly extending probe arm, part of a housing being removed.
Figure 13:
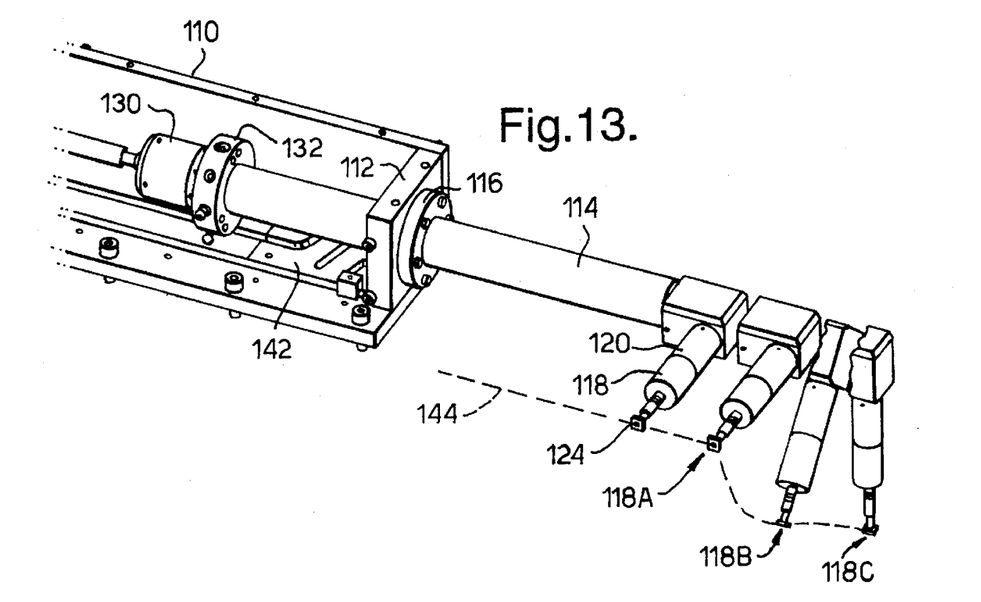
FIG. 13 shows part of the probe arm of FIG. 12, with several different positions of a probe during movement.
Figure 14:
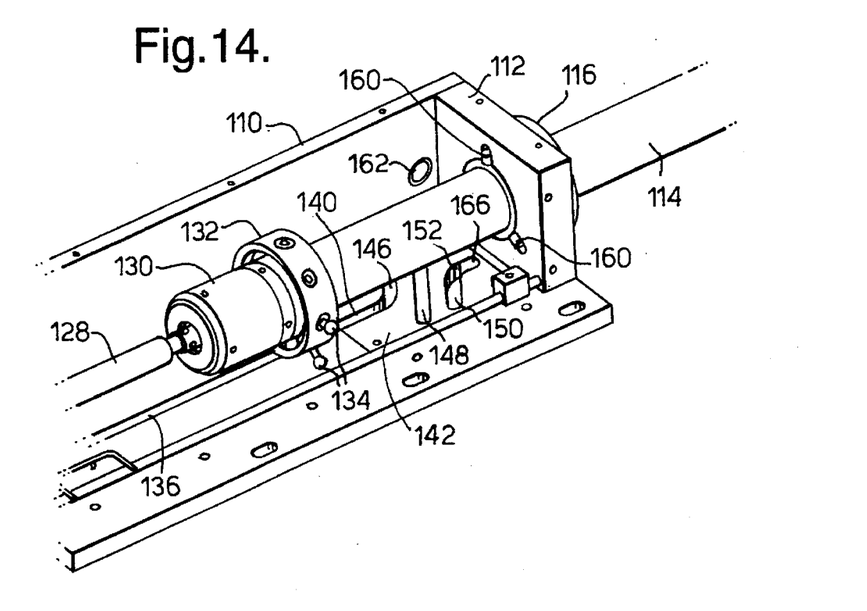
FIG. 14 is an isometric view of a part of the probe arm, showing features which are hidden in FIG. 12.

The probe arm shown in FIGS. 12–14 comprises a housing 110, for mounting on fixed structure of a machine tool. A movable arm member 114 projects through a bearing 116 in an end plate 112 of the housing. The free end of the arm member 114 carries a probe 18 on a lateral extension 120. The probe 118 may for example be a touch trigger probe of the type described in U.S. Pat. No. 4,153,998, and has a deflectable stylus 122 carrying a stylus tip 124. This stylus tip 124 is of the square type normally used for setting the cutting tools in a machine tool. However, the probe arm may be mounted in a suitable way for measuring a workpiece, in which case another appropriate stylus tip would be used.

The movable arm member 114 can be extended and retracted longitudinally through the bearing 116 as indicated by arrows 138, by means of a hydraulic ram 126 having a piston rod 128. The piston rod 128 is connected to the movable arm member 114 through a coupling mechanism 130, described in more detail below with respect to FIG. 17. FIG. 12 shows the arm member 114 midway between a fully retracted, inoperative position, and a fully extended, operative position.

Within the housing 110, a collar 132 is fixed to the movable arm member 114. This collar carries three radially projecting follower pins 134; in FIG. 12 only two of these pins can be seen, while the third projects radially downwards and engages a slot 136 in the floor of the housing 110. The slot 136 extends longitudinally, parallel to the arm member 114 and acts with the downwardly projecting follower pin 134 to guide the movable arm 114 as it is pushed along its longitudinal axis by the hydraulic ram 126. While this pin 134 follows the longitudinal slot 136, it ensures that the probe 118 remains in the horizontal attitude shown in FIG. 12.

As it moves towards the operative position along the slot 136, the downwardly projecting follower pin 134 passes into an entry slot 140 in a rotation guiding block 142. The function of this block is to guide the movable arm 114 in a swivelling motion about its longitudinal axis, as it continues to be pushed linearly towards the operative position by the ram 126. The rotation guiding block 142 is shown in more detail in FIGS. 15 and 16 (which, however, show the block arranged to produce rotation in the opposite sense to that shown in FIGS. 12–14).

FIG. 13 shows the motion of the movable arm 114 and the probe 118 on its extension 120, as the arm approaches the operative position and is caused to swivel by the rotation guiding block 142. The probe adopts successive positions 118A,118B,118C, with its stylus tip 124 following the path shown by broken line 144, until the probe has swivelled through 90°.

Figure 16:
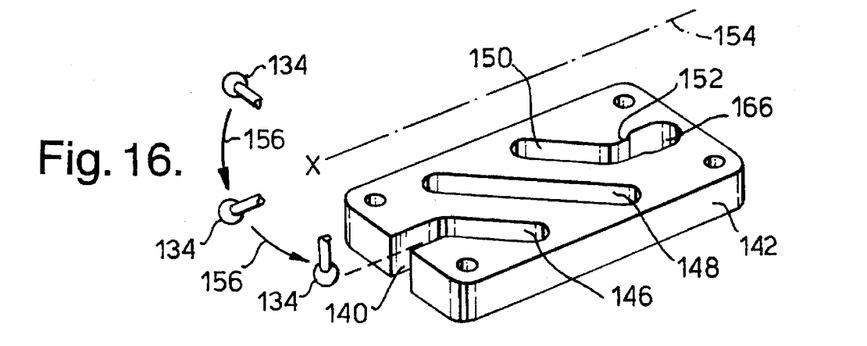
FIG. 16 is an isometric view of the rotation guide block of FIG. 15, indicating rotary motion of follower pins of the probe arm.

To produce this swivelling, the entry slot 140 of the block 142 leads the downwardly projecting follower pin 134 around a smooth curve into an oblique slot portion 146. As the downwardly projecting follower pin 134 follows this oblique portion, it causes the arm 114 to commence its swivelling, simultaneously with the linear movement. FIG. 16 shows the longitudinal rotational axis 154 of the arm 114, about which the follower pins 134 rotate as indicated by arrows 156. After a certain amount of swivelling, the downwardly projecting pin 134 will start to lift out of the slot portion 146. At the same time, however, the next pin 134 will enter an oblique slot 148 in the block 142, which continues to guide the swivelling movement of the arm 114 as it extends linearly. Eventually, as the linear motion continues, this pin 134 too leaves the oblique slot 148, but the final pin 134 simultaneously engages in a further oblique slot portion 150. This continues to guide the swivelling motion, until the slot portion 150 leads around a smooth curve to an axially extending slot portion 152. The probe 118 has now swivelled through the 90°, seen in FIG. 13, and the slot portion 152 guides it axially for a short distance to the fully operative position.

Figure 15:
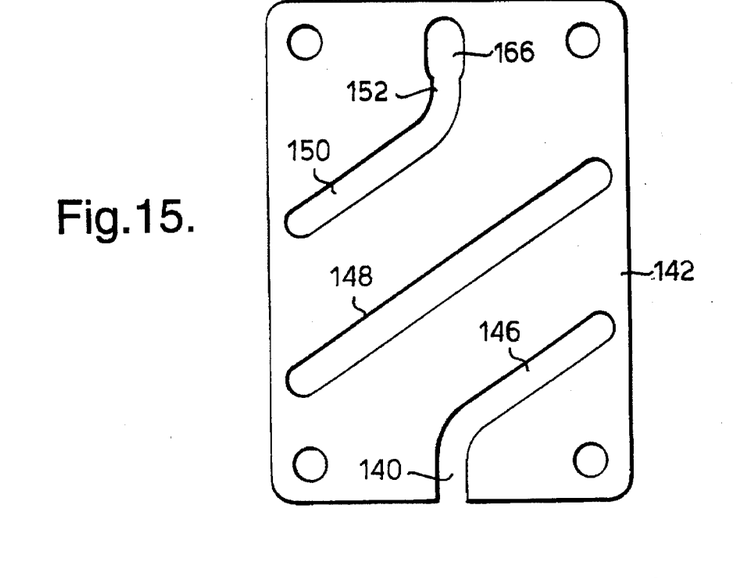
FIG. 15 is a plan view of a rotation guide block used in the probe arm of FIG. 12.

It will be seen that the engagement of the follower pins 134 in the oblique slot portions 146,148,150 effectively acts as a screw to guide the swivelling motion of the arm 114 as it is extended axially. The amount and the rotational sense of the swivelling is governed by these oblique slot portions. For example, the rotational sense can be reversed simply by fixing the block 142 upside down in the housing 110 and fixing the pins 134 on the other side of the collar 132. (The block 142 is shown upside down in FIGS. 15–16, compared with FIGS. 12–14.) The arm may be swivelled through an angle greater than 90° by the provision of one or more extra oblique slots 148, with a corresponding extra number of follower pins 134 spaced at appropriate positions around the collar 132. Similarly, if a swivel angle less than 90° is required, then only two follower pins 134 may be used, the slot 148 may be omitted and the slot portion 150 positioned in its place.

Of course, other guide arrangements than the pins 34 and slots 136,146,148,150 can be envisaged. For example, static pins may be provided on the floor of the housing, engaging in appropriately directed slots provided on the collar 132.

In the operative position 118C seen in FIG. 13, it is desired that the probe 118 should be held repeatably in a precisely defined location, so that the measurements or toolsetting performed with the probe may be repeatable. This is achieved by a kinematic support arrangement, which will now be described.

For the kinematic support, the collar 132 is provided with three forward facing pairs of balls 158 (one pair of which is hidden in FIG. 12). These pairs of balls are spaced at 120° from each other around the longitudinal axis of the arm 114. Three similarly spaced cylindrical elements 160 face rearwards from the end plate 112 of the housing 110—two of the elements 160 are visible in FIG. 14. In the operative position, the pairs of balls 158 are guided into engagement with the respective elements 160 by the action of the pins 134, slot 136 and guide block 142. This engagement constrains the degrees of freedom of the movable member 114 kinematically to precisely define the operative position. Of course, any other arrangement of elements co-operating to produce a kinematic support may be used—see for example the alternative arrangements described by H. J. J. Braddick in "Mechanical Design of Laboratory Apparatus", Chapman & Hall, London, 1960, pages 11–30.

If desired, a proximity sensor may be fitted in a hole 162 in the housing 110 (FIG. 14), to detect the presence of the collar 132 and thus give an indication that the arm 114 has reached the operative position. Similarly, a proximity sensor may be fitted in a hole 164 (FIG. 12) to detect the collar 132 when the arm 114 is fully retracted into the inoperative position.

In the operative position, it is important that the six degrees of freedom of the arm 114 should be constrained only by the kinematic support elements 158,160, and that no substantial additional constraints should be provided by (for example) the bearing 116, the pins 134, or by the mechanism 130 by which the arm 114 is coupled to the piston rod 128. In the case of the bearing 116, this is achieved by using a bearing with a slight amount of play. In order to reduce the amount of play which is necessary, so that the arm 114 slides smoothly, the bearing 116 is not securely bolted to the end plate 112 of the housing until after the arm 114 has been assembled within it. The arm 114 is biased into the operative position with the balls 158 kinematically engaging the cylindrical elements 160, and the bearing 116 is finally secured to the end plate 112 with the arm 114 in this position.

It will also be noted, e.g. from FIG. 15, that the final slot portion 152 in the rotation guiding block 142 has an enlarged end section 166. This ensures that the corresponding follower pin 134 is not constrained in the slot when the arm is in the operative position, so that it too provides no additional constraint to disturb the kinematic support.

The connection between the arm 114 and the piston rod 128 of the hydraulic ram is provided by the coupling mechanism 130 mentioned previously. This is seen in more detail in FIG. 17, in the condition before the arm 114 reaches the operative position. The mechanism 130 has a body 174 with an end cap 170 by which it is secured to the inner end of the arm 114. The body 174 has an internal conical face which (in the inoperative position) mates with a conical insert 178. The insert 178 is mounted rotatably on an axle 172, via a rotary bearing 176, held in place by a circlip 182. The axle 172 is threaded to connect it with the end of the piston rod 128. This threading allows the longitudinal position of the axle 172 with respect to the piston rod 128 to be adjusted during assembly.

Figure 17:
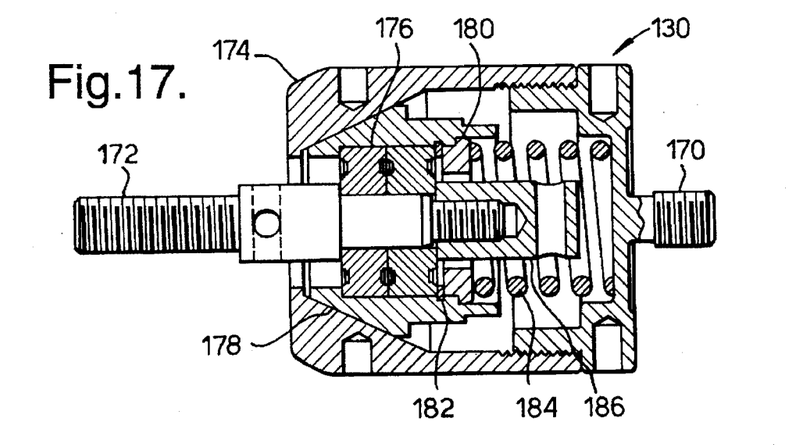
FIG. 17 is a cross-section of a coupling mechanism of the probe arm of FIG. 12.

In the inoperative position as shown in FIG. 17, the conical insert 178 is biased into the internal taper of the body 174 by a compression spring 184, acting through a shoulder washer 180. When the hydraulic ram 126 is activated, the coupling mechanism remains in this condition throughout the time that the downwardly projecting follower pin 134 travels along the longitudinal slot 136 in the floor of the housing 110. It also remains in this condition when the arm 114 is swivelled by the engagement of the follower pins 134 in the slot portions 146,148,150. As this swivelling takes place, the end cap 170, body 174 and insert 178 of the coupling mechanism 130 rotate relative to the axle 172 on the bearing 176.

When the operative position is reached and the kinematic support elements 158,160 engage, further axial movement of the body 174 is of course prevented. Continued axial movement of the piston rod 128 and axle 172 causes the conical insert 178 to separate from the internal taper of the body 174, compressing the spring 184. During assembly, the axial position of the axle 172 on the piston rod 128 is adjusted such that, at the end of the stroke of the ram 126, the insert 178 is free of all contact inside the body 174. The only connection between the axle 172 and the end cap 170 is then via the spring 184. This ensures that the piston rod 128 does not provide any constraint which would interfere with the kinematic support.

The ram 126 has a reasonably well defined end position to its stroke, so that, each time it is operated, the spring 184 is compressed by the same amount. The spring 184 provides the entire biasing force holding the kinematic support elements 158,160 in engagement with each other. Because it is compressed by the same amount each time, the biasing force provided by the spring 184 is fairly repeatable. This is advantageous, since it helps to assure the repeatable operative position of the arm 114 provided by the kinematic support elements.

Inside the body 174 of the coupling mechanism 130, a stop member 186 is screwed onto the end of the axle 172. This acts to secure the bearing 176 onto the axle 172. It also acts as a safety stop, in the event that the arm 114 should hit an unexpected obstruction as it is extended. In this event, the stop member 186 will hit the end cap 170, so that the thrust of the hydraulic ram is transmitted directly from the axle 172 to the end cap 170 and does not damage components such as the bearing 176.

In some applications, the swivelling action provided by the rotation guide block 142 may not be required. In this case, the slot 136 in the floor of the housing may extend right up to an enlarged end section similar to the slot section 166 seen in FIG. 15. The block 142 is then unnecessary, but if it is desired to reduce manufacturing costs by using common components for different designs of arm, then the block 142 may be replaced by a similar block which has only a longitudinal extension of the slot 136, plus an enlarged end section 166, but no oblique slot portions 146,148,150. Of course, only one of the follower pins 134 is then needed, engaging in the slot 136.

Where no swivel action is required, then the bearing 116 may be simpler since it need only provide for sliding movement of the arm 114 and not rotation. It would also be possible to omit the bearing 176 in the coupling mechanism 130, the conical insert 178 being fast with the axle 172. However, it is desirable to retain the bearing 176 since it facilitates the longitudinal adjustment of the threaded axle 172 on the end of the piston rod 128.

In one possible application of the probe arm described, it may be mounted next to or above the rotatable chuck of a lathe, parallel to the axis of rotation of the chuck. When the probe 118 is to be used to set a cutting tool mounted in a tool post or turret of the lathe, the arm is extended from its inoperative, retracted position. First of all, the linear motion of the arm positions the probe generally between the chuck and the tool. Towards the end of the linear motion, the swivelling action brings the stylus tip 124 of the probe 118 onto the centre line of the lathe, into the appropriate operative position for setting the tool. The tool is then brought into contact with the stylus tip 124 by operating the slidable carriages upon which the tool post or turret is mounted.

Of course, many other applications can be envisaged, in which the probe arm is mounted in other positions on a lathe or on another machine tool. In some applications, when the probe 118 is in the operative position, it may be used for measuring a workpiece rather than a cutting tool, in which case an appropriate stylus tip will be used in place of the tip 124. This can be of use, for example, in machine tools which can pick up the workpiece in a movable spindle. The spindle then brings various surfaces of the workpiece which are to be measured into contact with the stylus tip of the probe.

We claim:

1. A probe arm for a machine tool, comprising:
    a fixed base member for attachment to the machine tool;
    a movable arm member for carrying a probe;
    a stop between the fixed and movable members, which defines an operative position in the movement of the movable member and prevents further movement thereof past the operative position;
    means for biasing the movable arm member into engagement with the fixed member at said stop when the movable arm member is in the operative position;
    wherein said stop comprises elements on the movable arm member and on the fixed member which are urged together by the biasing means;
    said elements cooperating with each other to constrain the degrees of freedom of the movable arm member kinematically, thereby precisely defining the operative position of the movable arm member;
    and wherein said biasing means provides a repeatable biasing force when the movable arm member is in the operative position.

2. A probe arm according to claim 1, wherein the biasing means comprises at least one spring, which is stretched or compressed by a repeatable amount when the movable arm member is in the operative position.

3. A probe arm according to claim 2, including a further stop, which when engaged defines said repeatable stretching or compression of said at least one spring.

4. A probe arm according to claim 1, wherein the biasing means is attached to a further movable member, which moves by a repeatable amount after the movable arm member reaches the operative position, said repeatable movement of the further movable member providing said repeatable biasing force.

5. A probe arm according to claim 1, including a motor for moving the movable member relative to the fixed member.

6. A probe arm according to claim 4, including a motor for moving said further movable member, and a switch for switching off the motor when the further movable member has moved by said repeatable amount.

7. A probe arm according to claim 1, including a further movable member, which is mounted in a bearing for smooth rotation on the fixed base member into the operative position from an inoperative position, the movable arm member being biased into engagement with said further movable member during said rotation, and disengaging therefrom when it reaches the operative position.

8. A probe arm according to claim 7, wherein the biasing means is attached to the further movable member, which moves by a repeatable amount after the movable arm member reaches the operative position, said repeatable movement of the further movable member providing said repeatable biasing force.

9. A probe arm for a machine tool, comprising:
    a fixed member for attachment to the machine tool;
    an elongate movable arm member for carrying a probe, the movable arm member having an axis;
    a guide which guides the movement of the movable arm member in an axial direction between an inoperative position in which it is retracted towards the fixed member, and an operative position in which it is extended away from the fixed member;
    a stop between the fixed member and the movable arm member, which defines said operative position and prevents further movement of the movable arm member past the operative position, said stop comprising first elements on the fixed member and second elements on the movable member, the first and second elements being urged together in the operative position and cooperating with each other to constrain the degrees of freedom of the movable arm member kinematically, thereby precisely defining the operative position of the movable arm member.

10. A probe arm according to claim 9, including a biasing device acting on the movable arm member, said biasing device providing a repeatable force to urge said first and second elements together in the operative position.

11. A probe arm according to claim 10, wherein said biasing device comprises a spring acting between the movable arm member and a further movable member, the further movable member moving by a repeatable amount after the movable arm member reaches the operative position, said repeatable amount of movement causing the spring to provide said repeatable force.

12. A probe arm according to claim 9, wherein said guide includes a guide portion which acts on the movable arm member to provide a rotary motion thereof as it moves into the operative position, in addition to said movement in the axial direction.

* * * * *